No. 663,526. Patented Dec. 11, 1900.
A. WHITE.
BOY'S WAGON.
(Application filed July 30, 1900.)
(No Model.)
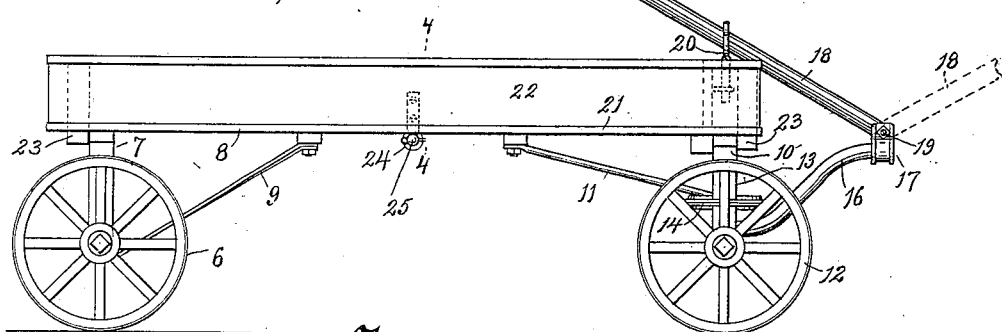
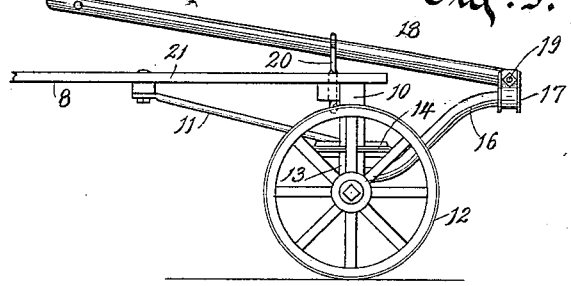
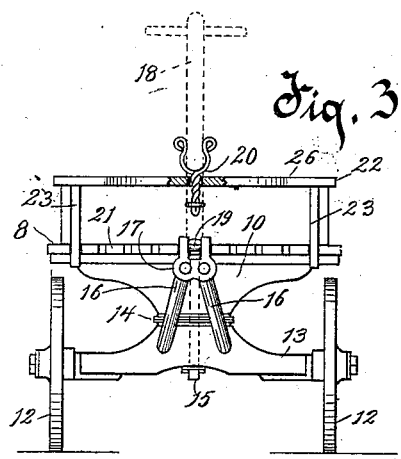
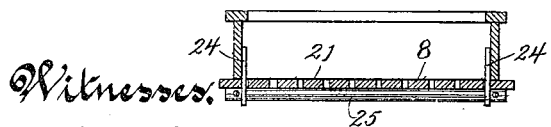
Witnesses.
Anna V. Faust
H. C. Carter
Inventor.
Arthur White
By Benedict & Morsell
Attorneys.

UNITED STATES PATENT OFFICE.

ARTHUR WHITE, OF SHEBOYGAN FALLS, WISCONSIN.

BOY'S WAGON.

SPECIFICATION forming part of Letters Patent No. 663,526, dated December 11, 1900.

Application filed July 30, 1900. Serial No. 25,226. (No model.)

*To all whom it may concern:*

Be it known that I, ARTHUR WHITE, of Sheboygan Falls, in the county of Sheboygan and State of Wisconsin, have invented a new and useful Improvement in Boys' Wagons, of which the following is a description, reference being had to the accompanying drawings, which are a part of this specification.

The invention consists of the devices and their combinations as herein described and claimed or the equivalents thereof.

In the drawings, Figure 1 is a side elevation of a boy's wagon embodying my improvements. Fig. 2 is a top plan view of the wagon shown in elevation in Fig. 1. Fig. 3 is an elevation of the front end of the wagon shown in Fig. 1, the tongue being indicated in dotted lines and parts being broken away to expose otherwise-hidden construction. Fig. 4 is a transverse section on line 4 4 of Fig. 1. Fig. 5 is a side elevation of a fragment of the front end of the wagon, the sides of the wagon-box being removed.

In the drawings, 6 6 are the rear wheels, mounted on an axle provided with a bolster 7, which bolster is secured to the bottom 8; also, braces 9 9 are advisably secured to the rear axle and to the bottom. At the front end of the bottom 8 a bolster 10 is secured to the same, and a brace 11 is advisably connected to the lower edge of the bolster and to the bottom 8. The front wheels 12 12 are mounted on an axle 13, and the axle 13 and the bolster 10 are each provided with a circle piece complementary to each other, forming the fifth-wheel or bearings 14 between the axle and the bolster, by means of which the bolster and its load are supported on the axle and permit the axle to swivel thereunder. A kingbolt 15 connects the axle to the bolster and is the pivot about which the swiveling of the axle occurs on the bearings 14.

The special object of my improvements is to adapt a boy's wagon of the general character of the one shown and described for use as a coaster, the improvements being chiefly directed to means whereby the boy or person using it can readily and successfully change or otherwise control the direction of the running of the wagon downhill or as a coaster by shifting the position of the front axle and the wheels thereon. For this purpose a pair of hounds 16 16 are fixed in the axle 13 and project forwardly and upwardly therefrom, the hounds being advisably so inserted in the axle as to converge toward each other outwardly. The upward projection of the hounds is also preferably to such extent as to bring their front extremities nearly or quite up to the plane of the bottom 8. A block 17 or crosspiece is secured to the front extremities of the hounds, and this block is constructed to receive therein the end of the tongue 18, which is pivoted to the block conveniently by means of a bolt 19, so as to permit the tongue to extend forwardly from the hounds for the purpose of hauling the wagon about and to permit of its being thrown over rearwardly into the position shown in Figs. 5 and 1, in which it serves as a lever or tiller, which can be grasped by a boy sitting on the wagon and swung to right or left to thereby shift the position of the wheels and change the direction of the running of the wagon. A fulcrum for the tongue 18, when it is thrown over to the rear and serves as a tiller, is provided, which preferably consists of a thole-pin 20 or pin having a furcate or U-shaped upper end, which pin is inserted loosely in a socket-bearing therefor in the front end of the wagon bottom or box. The tongue when thrown over rearwardly rests in this thole-pin, which serves as a fulcrum for the tongue or tiller, and whereby, because of the length of the hounds and the tongue in front of the axle 13, the boy can easily and surely shift the front axle and change the direction of the running of the wagon.

In Fig. 5 I have shown the thole-pin 20 as mounted in the front end of the bottom 8. As preferably constructed this bottom consists of longitudinal strips of elastic wood 21 21, located at little distances apart, forming a slatted spring-bottom. This is a very light wagon for being hauled up a hill for coasting, and because of the elasticity of the bottom is a very agreeable vehicle, in the nature of a spring-buckboard, on which to coast down a hill, and in this form of construction the tongue 18, serving as a tiller, is in such substantially horizontal position as to serve most advantageously and powerfully as a lever or tiller for shifting the front axle, so that the vehicle is easily under the control of the boy using it; but it is sometimes desirable that the wagon should have a more rigid construction and that it should be adapted for holding parcels or packages or for analogous use, and for this purpose a rigid box 22, consisting of side and end walls, the sides adapted to fit on the bottom 8, is provided, which box has pins or dowels 23 projecting from its lower edge, which enter sockets therefor in the bottom 8, advisably passing through the slots in the bottom just at the front of the front bolster 10 and at the rear of the rear bolster 7, respectively, whereby the box is prevented from undesirable movement forward or rearwardly or laterally on the bottom. Clips 24 24, secured to the sides of the box medially, extend down through slots in the bottom, and a cross-bar 25, inserted in the clips 24 and extending transversely under the bottom, serves to hold the bottom securely to the box and also prevents the springing or yielding of the bottom downwardly away from the box. The box can be readily removed by taking out the cross-bar 25. When the box 22 is on the bottom 8, as shown in Fig. 1, the thole-pin 20 is removed from its position, as shown in Fig. 5, in the bottom 8 and is placed in the front end of the box, being advisably inserted through an end piece 26 provided therefor, which end piece is secured to and made a part of the box.

It will be observed that in the construction shown in Figs. 1, 2, and 3 the thole-pin 20 is in the line of the extension of the king-bolt 15, which is a preferable location for this thole-pin; but in the construction shown in Fig. 5 the thole-pin cannot well be located in the continuation of the axis of the king-bolt and is therefore located a little at the rear thereof, but very close thereto. It will also be noticed that the bolster 10, the bottom 8, and the bolster 7 being connected together rigidly form what is properly denominated the "frame" of the wagon, and that in connection therewith and as a part thereof the box 22 is sometimes employed and when so used is a part of the wagon-frame. By this special construction the user gets two wagons in place of one and at about the expense of one.

What I claim as my invention is—

1. Steering devices for a wagon, comprising a swiveling front axle provided with wagon-wheels, hounds secured to and projecting from the front axle forwardly and upwardly, a tongue pivoted in the hounds so as to be capable of extension forwardly or rearwardly from its pivot, and means on which the tongue can fulcrum medially when extending rearwardly.

2. In combination, a front axle provided with wheels, a wagon-frame to which the front axle is swiveled, a pair of hounds projecting forwardly and upwardly from the front axle, a tongue pivoted in the hounds, and a thole-pin mounted on the wagon-frame at the rear of the hounds and substantially in the prolongation of the axis of the king-bolt.

3. In combination in a boy's wagon, a wagon-frame, a front axle swiveled to the frame, a pair of hounds fixed in and projecting forwardly and upwardly from the front axle, a cross-piece fixed on the front ends of the hounds, a tongue pivoted in the cross-piece, and a thole-pin mounted rotatably in the front end of the frame at the rear of the hounds, said thole-pin being adapted to receive the tongue medially and removably therein and to serve as a fulcrum in and with which the tongue can be swung laterally.

4. In combination, a wagon-frame comprising a front and a rear bolster, an elastic bottom secured to the bolsters, rigid sides and ends of a box fitted removably on the bottom, means to clamp the bottom medially to the under edges of the box, and a front axle swiveled under the front end of the frame, hounds projecting forwardly and upwardly from the front axle, a tongue pivoted in the front ends of the hounds, and means on the front end of the frame adapted to take the tongue medially therein, and serve as a fulcrum therefor.

5. In combination in a wagon, front and rear bolsters, a spring-bottom secured to and extending from one bolster to the other bolster, a box 22 comprising side and end boards, clips 24 fixed to the sides medially and adapted to project through and below the bottom, and a transverse bar 23 adapted to enter the clips and hold the bottom to the box.

In testimony whereof I affix my signature in presence of two witnesses.

ARTHUR WHITE.

Witnesses:
C. T. BENEDICT,
ANNA V. FAUST.